United States Patent
Soma et al.

Patent Number: 5,489,483
Date of Patent: Feb. 6, 1996

[54] POROUS SINTERED BODIES AND SOLID OXIDE FUEL CELLS USING SUCH POROUS SINTERED BODIES AS AIR ELECTRODES

[75] Inventors: Takao Soma, Aichi; Tomonori Takahashi, Chita; Shinji Kawasaki; Hirotake Yamada, both of Nagoya; Kazuyo Mori, Ichinomiya, all of Japan

[73] Assignee: NGK Insulators, Ltd., Japan

[21] Appl. No.: 297,096

[22] Filed: Aug. 29, 1994

[30] Foreign Application Priority Data

Sep. 3, 1993 [JP] Japan ................................. 5-220044
Dec. 28, 1993 [JP] Japan ................................. 5-350277

[51] Int. Cl.⁶ ........................... H01M 12/06; H01M 4/86
[52] U.S. Cl. ............................ 429/27; 429/30; 429/45; 429/218
[58] Field of Search ........................ 429/45, 40, 30, 429/33, 218, 27

[56] References Cited

U.S. PATENT DOCUMENTS

| | | | |
|---|---|---|---|
| 5,108,850 | 4/1992 | Carlson et al. | 429/40 X |
| 5,217,822 | 6/1993 | Yoshida et al. | 429/40 X |
| 5,266,419 | 11/1993 | Yamada | 429/30 |
| 5,277,995 | 1/1994 | Ruka et al. | 429/45 X |
| 5,308,712 | 5/1994 | Seike et al. | 429/40 X |

FOREIGN PATENT DOCUMENTS

| | | |
|---|---|---|
| 0395399 | 10/1990 | European Pat. Off. . |
| 0467590 | 1/1992 | European Pat. Off. . |
| 0532024 | 3/1993 | European Pat. Off. . |
| 4406276 | 9/1994 | Germany . |

*Primary Examiner*—Anthony Skapars
*Attorney, Agent, or Firm*—Parkurst Wendel & Rossi

[57] ABSTRACT

A porous sintered body is composed of a perovskite-type composite oxide, wherein A-site of the composite oxide are occupied by one or more kinds of first metallic elements selected from the group consisting of calcium and strontium, one or more kinds of second metal elements selected from the group consisting of rare earth elements and yttrium excluding lanthanum and cerium, and lanthanum, the above one or more kinds of the first metallic elements amount to 5 to 70 mol % of the A-sites, and manganese is contained in B-sites of the composite oxide.

53 Claims, 2 Drawing Sheets

$La_{0.65-x}Ca_{0.35}A_xMnO_3$

FIG_1

POROUS SINTERED BODIES AND SOLID OXIDE FUEL CELLS USING SUCH POROUS SINTERED BODIES AS AIR ELECTRODES

BACKGROUND OF THE INVENTION (1) Field of the Invention

The present invention relates to porous sintered bodies and solid oxide fuel cells using such porous sintered bodies as air electrodes.

(2) Related Art Statement

In developing solid oxide fuel cells (SOFC), it is important to discover materials stable at high temperatures. As a material for air electrodes of the SOFC, lanthanum manganite sintered bodies have now been considered promising (Energy General Engineering, No. 13, Vol. 2, pp 52–68, 1990). As such lanthanum manganite sintered bodies, some having almost chemically stoichiometric compositions or others having manganese-rich compositions in which no elements are present in a part of A-sites (to be occupied by lanthanum), are known. It is reported that the lanthanum manganite sintered body having the composition in which no elements are present in a part of the A-sites decreases its weight as the temperature rises from room temperature to 1000° C. (J. ELectrochem. Soc. vol. 138, No. 5, pp 1519–1523, 1991). In this case, the weight of the sintered body begins to decrease from near 800° C. In particular, a porous sintered body composed of lanthanum manganite doped with Ca or Sr at A-sites is considered promising as a material for air electrodes including self-supporting type air electrode tubes.

SUMMARY OF THE INVENTION

However, the present inventors have first discovered that there exist the following problems with respect to such a porous sintered body. That is, it was clarified that when a SOFC unit cell with this porous sintered body is subjected to heating-cooling cycling (heat cycling) between a temperature range of 900° C. to 1100° C. as a power-generating temperature range of the SOFC and a temperature range of room temperature to 600° C., cracking occurs between the air electrode made of the above porous sintered body and other constituents materials of the unit cell to break the unit cell.

In addition, on the other hand, even if the above unit cell was operated at 1000° C. for an extended time period, such cracking did not occur at all. Therefore, it is considered that the above cracking phenomenon is caused not by firing shrinkage of the porous sintered body but by dimensional change due to dimensional changes in the heat cycling.

In order to solve the above problem, NGK Insulators, Ltd. proposed a technique that the dimensional shrinkage caused by the above heat cycling between room temperature and 1000° C. is reduced by replacing a part of lanthanum atoms at A-sites of the lanthanum manganite porous sintered body by a greater amount of calcium or strontuim as compared with the conventional porous sintered bodies (Japanese patent application No. 5-49,314 filed on Mar. 10, 1993 but not yet published, now Japanese patent application Laid-open No. 6-287,048, published Oct. 11, 1994).

However, it was clarified that the coefficient of thermal expansion of such a lanthanum manganite porous sintered body becomes greater than that of the conventional materials for the air electrode. For this reason, since the coefficient of thermal expansion of the air electrode becomes greater than those of other constituent parts of the SOFC unit cell, particularly, that of the solid electrolyte film, it is feared that cracking may occur between the air electrode material and the other constituent parts. On the other hand, it is known that the appropriate average coefficient of thermal expansion of the lanthanum manganite sintered body as the air electrode is preferably in a range of $10.2 \times 10^{-6} K^{-1}$ to $10.8 \times 10^{-6} K^{-1}$ (See U.S. Pat. No. 5,108,850, column 3, line 12).

An object of the present invention is to stabilize the porous sintered body against the above heat cycling, and to suppress the average coefficient of thermal expansion of the porous sintered body to a relatively low range of $10.2 \times 10^{-6} K^{-1}$ to $10.8 \times 10^{-6} K^{-1}$.

The porous sintered body according to the present invention is composed of a perovskite-type composite oxide, wherein A-sites of said composite oxide are occupied by one or more kinds of first metallic elements selected from the group consisting of calcium and strontium, one or more kinds of second metallic elements selected from the group consisting of rare earth element and yttrium excluding lanthanum and cerium, and lanthanum, said one or more kinds of said first metallic elements amount to 5 to 70 mol % of said A-sites, and manganese is contained in B-sites of the composite oxide.

Further, the present invention is aimed at the provision of a solid oxide fuel cell including an air electrode made of the above porous sintered body.

First, the phenomenon that the porous sintered body undergoes dimensional shrinkage through heat cycling will be explained. The present inventors subjected conventional lanthanum manganite porous sintered bodies to the heating-cooling cycling between a temperature range of 900° C. to 1100° C. and a temperature range of room temperature to 600° C., and examined their stability. In such lanthanum manganite sintered bodies, 10 mol % to 25 mol % of the A-sites were replaced by strontium or calcium.

As a result, it was clarified that the above porous sintered body was dimensionally shrunk in an amount of 0.01 to 0.04% per one heat cycling in terms of length. In addition, the shrinkage in the heat cycling was not converged even after application of 100 heat cycles, and amounted to 2–4% of the original dimension in the 100 heat cycles. It was also clarified that when the air electrode is shrunk like this, cracking occurs between the air electrode and the other constituent materials to break the unit cell.

The present inventors have proceeded with their research in order to solve the above problem. As a result, the inventors had discovered that in the case of the porous sintered body composed of the composite oxide having the above composition, the dimensional shrinkage caused by the heat cycling between room temperature and 1000° C. can be suppressed to not more than 0.01% per one heat cycle. In addition, it was confirmed the even if this porous sintered body is subjected to the heating-cooling cycling between the temperature range of room temperature to 600° C. and the temperature range of 900° C. to 1100° C., no cracking occurs between the porous sintered body and the other constituent materials.

Furthermore, according to the above porous sintered body, it was clarified that the average coefficient of thermal expansion in a temperature range of 25° C. to 1000° C. can be suppressed to a relatively low range of $10.2 \times 10^{-6} K^{-1}$ to $10.8 \times 10^{-6} K^{-1}$. Therefore, when the porous sintered body of the present invention is used as a high temperature electrode material such as an air electrode material in the SOFC, cracking and breakage are prevented due to differences in the coefficients of thermal expansion between the other constituent materials.

In the above, that the dimensional shrinkage is not more than 0.01% per one heat cycle means that when the porous sintered body is subjected to 10 heat cycles beginning from the first one after being sintered, the average dimensional shrinkage in these 10 heat cycles is 0.01%.

These and other objects, features and advantages of the invention will be appreciated upon reading the following description of the invention when taken in conjunction with the attached drawings, with the understanding that some modifications, changes and variations can be easily made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

Figure 1:
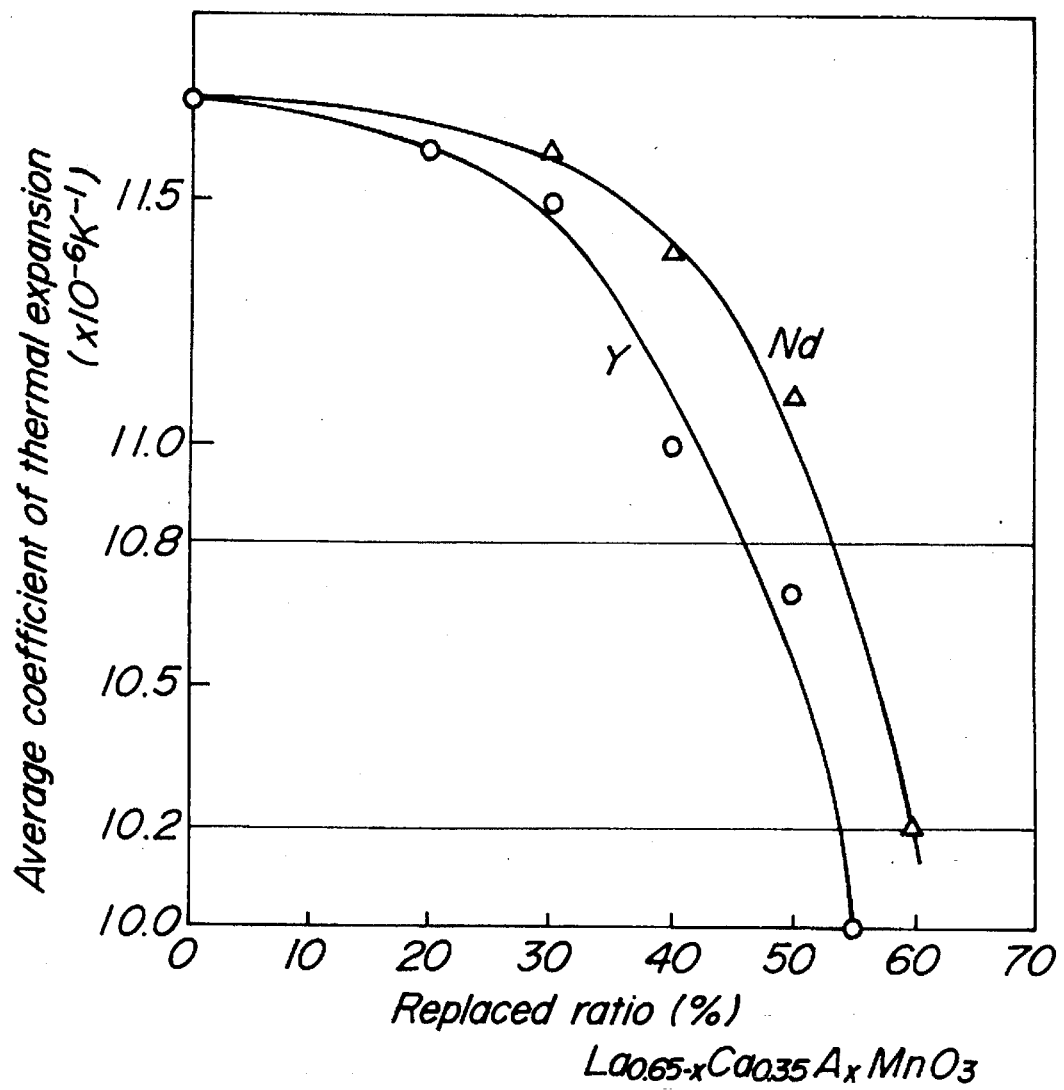
FIG. 1 is a graph showing average coefficients of thermal expansion measured with respect to porous sintered bodies having compositions of La—Ca—Nd or Y—Mn series.

The present inventors have proceeded with further research on a mechanism by which the porous sintered body is dimensionally shrunk due to the above heat cycling. As a result, the inventors discovered that if a value obtained by dividing the weight of the porous sintered body at 1000° C. by that at room temperature is set at not less than 0.9988, the above dimensional shrinkage is conspicuously suppressed. That is, if the porous sintered body is heated from room temperature to a high temperature of around 1000° C., the weight of the porous sintered body decreases, and this weight decrease has clear correlationship between the dimensional shrinkage in the above heat cycling.

The mechanism controlling the above phenomenon has not been clarified at present. However, when the temperature is raised from room temperature to around 1000° C., the weight of the porous sintered body slightly decreases, whereas when the temperature is lowered to room temperature again, the weight is restored. The dimensionally shrunk amount of the porous sintered body due to the above heat cycling slightly varies depending upon the crystalline particle diameter of the crystals constituting the sintered body, and the heating rate, the cooling rate, and the partial pressure of oxygen in the atmosphere during the heat cycling. That is, as the crystalline particle diameter decreases, as the heating and cooling rates are decreased, and/or as the partial pressure of oxygen becomes higher, the dimensionally shrunk amount of the porous sintered body increases. In order to decrease the dimensionally shrunk amount due to the heat cycling, it is preferable that the average crystalline particle diameter of the porous sintered body is set at not less than 3 μm.

From the above, it is presumed that oxygen comes in or out of the crystals of the composite oxide in a temperature range of not less than 800° C. during the above heat cycling, which causes changes in the weight of the porous sintered body. It is considered that when oxygen comes in or out of the crystals, the crystalline lattice is distorted, material transfer of metallic atoms is promoted, and the sintering phenomenon of the porous body proceeds.

Further, the present inventors have found through further research that the activating energy for the electric conductivity of the porous sintered body (hereinafter referred to as "activating energy") has clear correlationship to the dimensionally shrunk amount in the above heat cycling. That is, when Arrenius plots were prepared over a wide range of 200° C.–1000° C., it was revealed that dimensional shrinkage in the heat cycling proceeded with respect to porous sintered bodies in which a clear difference was observed between the activation energy in a range of 200° C. to 600° C. and that in a range of 900° C. to 1000° C.

More specifically, it was clarified that if a difference is set at not more than 0.–01 eV between the activation energy in the range of 200° C. to 600° C. and that in the range of 900° C. to 1000° C., the dimensional shrinkage due to the heat cycling between room temperature and 1000° C. can be suppressed to not more than 0.01% per one heat cycle.

The composition of the composite oxide constituting the porous sintered body according to the present invention is preferably expressed by the following formula: $La_{1-x-y}A_xD_yMn_{1-z}E_zO_3$ in which La, A and D occupy A-sites of the composite oxide, and Mn and E occupy B-sites thereof.

"A" denotes one or more kinds of the first metals selected from the group consisting of calcium and strontium. "D" denotes one or more kinds of the second metals selected from the group consisting of rare earth elements excluding lanthanum and cerium, and yttrium. The second metals include scandium, yttrium, praseodymium, neodymium, promethium, samarium, europium, gadolinium, terbium, dysprosium, holmium, erbium, thulium, ytterbium, and lutetium. The second metallic elements are preferably selected from the group consisting of praseodymium, neodymium, samarium, dysprosium, gadolinium and yttrium.

The substituting rate X of the first metallic element "A" is set at 5 to 70 mol %, preferably 25 to 50 mol %, of the A-sites of the porous sintered body. The substituting ratio Y of the second metallic element "D" is preferably 1 to 80 mol %, more preferably 20–60 mol % of the A-sites.

The substituting ratio (1-X-Y) of the lanthanum for the A-sites is preferably 1 mol % to 94 mol %.

"E" denotes one or more kinds of the third metals selected from the group consisting of aluminum, cobalt, magnesium and nickel, and the remainder of the B-sites are occupied by manganese. The substituting ratio Z of the third metallic element "E" may be 0 mol %. In this case, the B-sites of the composite oxide are occupied by manganese. Therefore, the above formula is represented by the formula: $La_{1-x-y}A_xD_yMnO_3$.

When a part of the B-sites are replaced by the third metallic element "E", the substituting ratio Z is preferably not more than 20 mol %. Further, 5 to 20 mol % is more preferable.

In the above formula: $La_{1-x-y}A_xD_yMn_{1-z}E_zO_3$, the third metallic elements replacing a part of the B-sites may be selected from the group consisting of chromium, copper, iron, titanium and zinc. In this case, the substituting ratio Z of the third metallic elements "D" is not more than 20 mol %, and more preferably 5 to 20 mol %.

Furthermore, a part of the B-sites may be replaced by one or more kinds of the third metallic elements selected from the group consisting of aluminum, cobalt, magnesium, nickel, chromium, copper, iron, titanium and zinc. In this case, the porous sintered body may be represented by the formula: $La_{1-x-y}A_xD_yMn_{1-a-b}G_aJ_bO_3$.

In this formula, G and J represent respectively different third metallic elements. The total ("a+b") of the substituting ratio "a" of G and that "b" of J is preferably not more than 20 mol %, and more preferably 5 to 15 mol %.

The total ratio of lanthanum, the ratio of the total number of "A" and "D" metallic atoms relative to that of metallic atoms of manganese and third metallic elements "E" (or further G+J) at the time of the formulation, that is, the ratio of the total number of the atoms at the A-sites/the total number of the atoms at the B-sites, is preferably not less than 0.85, and more preferably 1.05 so as to obtain a single phase in the composite oxide. In the above formula, the relative ratios of the A-sites and the B-sites are not given due to their complexity, but it is self-evident to insert such relative ratios into the formula. Further, when a solid electrolyte is provided adjacent the porous sintered body, the porous sintered body is preferably a composition which will not produce a high resistance layer of $La_2Zr_2O_7$.

In the porous sintered body of the present invention, it is acceptable that impurities inevitably mixed into the composite oxide during the production are contained.

The porous sintered body according to the present invention may be favorably used, particularly, as a high temperature electrode material stable against the heat cycling. As such high temperature electrode materials, an electrode material in nuclear fusion furnace and MHD generator may be recited. The porous sintered body of the present invention can be particularly favorably used as a material for the air electrode of the SOFC. Further, the inventive porous sintered body may be used as a material for the self-supporting type air electrode substrate of the SOFC (hereinafter referred to as air electrode substrate).

The above air electrode substrate may be used as a base body for a unit cell. Upon the air electrode substrate, various constituent parts such as a solid electrolyte film and a fuel electrode film are laminated one upon another. At that time, the air electrode substrate may have a cylindrical shape with opposite ends opened, a bottomed cylindrical shape with one end opened and the other closed, or a planar shape. Among them, the cylindrical shape is particularly preferred, because the air electrode substrate is unlikely to undergo thermal stress and is easy to be gas-tightly sealed.

The porosity of the porous sintered body is preferably 5 to 40%. When the porous sintered body is used as the material for the air electrode in the SOFC, the porosity of the sintered body is more preferably 15 to 40%, and most preferably 25 to 35%. In this case, when the porosity of the air electrode is not less than 15%, the gas-diffusing resistance is low, whereas if it is not more than 40%, strength can be ensured at a certain level.

In the following, more concrete experimental results will be explained.

Experiment 1

(1) Production of experimental materials

As starting materials, $La_2O_3$, $Mn_3O_4$, $CaCO_3$, $Y_2O_3$, $Dy_2O_3$, $Sm_2O_3$, $Pr_6O_{11}$, $SrCO_3$, NiO and CoO were used. In each Example, the starting materials were selectively measured and mixed to give a compounding recipe shown in Table 1. The resulting mixed powder was molded under pressure of 1 tf/cm² by cold isostatic press, thereby obtaining a molding. The molding was thermally treated at 1450° C. for 10 hours, thereby synthesizing a composite oxide having a composition shown in Table 1.

The resulting composite oxide was ground in a ball mill to obtain the powdery composite oxide having the average particle diameter of about 5 μm. Then, polyvinyl alcohol was dispersed, as an organic binder, into the composite oxide powder, and the mixture was molded into a rectangular plate by uni-axial press. The resulting molding was fired at 1300° C.–1500° C. in air for 4 hours, thereby obtaining a sintered body. Experimental samples having a vertical size of 3 mm, a lateral size of 4 mm and a length of 40 mm were cut out from this sintered body.

(2) Measurement of porosity

Porosity of each experimental sample was measured by a water-replacing process. Results are shown in Table 1.

(3) Measurement of the average coefficient of thermal expansion

Each sample was subjected to heating and cooling between 25° C. and 1000° C., and a dimensional change of the porous sintered body was measured. The average coefficient of thermal expansion in this temperature range was determined.

(4) Measurement of the dimensionally shrunk rate in heat cycling

Each experimental sample was heated up to 600° C. in air at 200° C./hr., and was subjected to 10 heat cycles between 600° C. and 1000° C. while the heating/cooling rates were set at 200° C./hr. Then, the sample was cooled to room temperature. At that time, the sample was kept at each of 600° C. and 1000° C. for 30 minutes in each heat cycle. Thereafter, the dimension of each experimental sample was measured by using a micrometer, and a dimensionally shrunk rate between before and after the heat cycling was determined. Measurement results are shown in Table 1.

TABLE 1

| Sample No. | Composition | Porosity (%) | Average coefficient of thermal expansion ($\times 10^{-6} K^{-1}$) | Coefficient of dimensional shrinkage (%/10 cycles) |
| --- | --- | --- | --- | --- |
| 1 | $La_{0.4}Ca_{0.3}Y_{0.3}MnO_3$ | 40.0 | 10.6 | 0.00 |
| 2 | $La_{0.4}Ca_{0.3}Dy_{0.3}MnO_3$ | 30.5 | 10.6 | 0.00 |
| 3 | $La_{0.2}Ca_{0.3}Sm_{0.5}MnO_3$ | 30.7 | 10.2 | 0.01 |
| 4 | $La_{0.2}Ca_{0.3}Pr_{0.5}MnO_3$ | 31.1 | 10.7 | 0.00 |
| 11 | $La_{0.9}Ca_{0.1}MnO_3$ | 29.9 | 12.2 | 0.05 |
| 12 | $La_{0.85}Ca_{0.15}MnO_3$ | 28.7 | 11.2 | 0.24 |
| 13 | $La_{0.8}Ca_{0.2}MnO_3$ | 31.7 | 10.8 | 0.16 |
| 14 | $La_{0.75}Ca_{0.25}MnO_3$ | 39.0 | 11.2 | 0.10 |
| 15 | $La_{0.7}Ca_{0.3}MnO_3$ | 35.5 | 11.4 | 0.02 |
| 16 | $La_{0.65}Ca_{0.35}MnO_3$ | 34.0 | 11.7 | 0.01 |
| 17 | $La_{0.8}Ca_{0.2}Mn_{0.99}Ni_{0.01}O_3$ | 33.1 | 10.8 | 0.30 |

TABLE 1-continued

| Sample No. | Composition | Porosity (%) | Average coefficient of thermal expansion ($\times 10^{-6} K^{-1}$) | Coefficient of dimensional shrinkage (%/10 cycles) |
|---|---|---|---|---|
| 18 | $La_{0.8}Ca_{0.2}Mn_{0.9}Co_{0.1}O_3$ | 31.1 | 11.1 | 0.02 |
| 19 | $La_{0.8}Ca_{0.2}Mn_{0.9}Ni_{0.1}O_3$ | 30.7 | 11.1 | 0.01 |
| 20 | $La_{0.9}Sr_{0.1}MnO_3$ | 34.2 | 12.2 | 0.12 |
| 21 | $La_{0.8}Sr_{0.2}MnO_3$ | 39.9 | 12.0 | 0.10 |
| 22 | $La_{0.7}Sr_{0.3}MnO_3$ | 38.9 | 12.4 | 0.02 |

As is seen from Table 1, in Sample No. 11 as a comparative example, the replacing amount of calcium is 10 mol %, the dimensionally shrunk rate is small. But the average coefficient of thermal expansion is large. In Sample No. 12 as a comparative example, the replacing rate of Ca is 15 mol %, and the dimensionally shrunk rate and the average coefficient of thermal expansion are both large. In Sample No. 13 as a comparative example, the average coefficient of thermal expansion is $10.8 \times 10^{-6} K^{-1}$ due to increase in the replacing amount of calcium, but the dimensionally shrunk rate is large.

In Sample Nos. 14, 15 and 16 as reference examples, as the replacing amount of calcium increases, the dimensionally shrunk rate decreases, but the average coefficient of thermal expansion successively increases.

In Sample No. 17 as a reference example, the average coefficient of thermal expansion is $10.8 \times 10^{-6} K^{-1}$, but the dimensionally shrunk rate is greater than in Sample No. 13. In Sample Nos. 18 and 19 in which a part of the B-sites is replaced by cobalt or nickel, the dimensionally shrunk rate is very low, but the average coefficient of thermal expansion is more than $11 \times 10^{-6} K^{-1}$.

In each of Sample Nos. 20, 21 and 22, the average coefficient of thermal expansion is more than $12 \times 10^{-6} K^{-1}$. In Sample No. 22, the dimensionally shrunk rate is decreased by increasing the replacing amount of strontium, but the average coefficient of thermal expansion is inversely increased.

To the contrary, in Sample Nos. 1 through 4 as examples of the present invention in which the A-sites of the composite oxide are occupied by lanthanum, calcium, various rare earth elements and yttrium, the dimensionally shrunk rate due to the heat cycling is small, and the average coefficient of thermal expansion is more conspicuously reduced as compared with Sample Nos. 15 and 16.

With respect to each of Sample Nos. 12, 13, 17 and 21, the present inventors measured the dimensional change of the porous sintered body in a temperature range of 25° C. to 1000° C. by using a thermal expansion meter, when the average coefficient of thermal expansion was measured. As a result, the inventors discovered that the dimensional shrinkage occurs in a temperature range from 900° C. to 800° C. when the temperature is being lowered. Therefore, it is presumed that oxygen atoms are absorbed or metallic atoms move during this temperature range. Further, it was confirmed that the results in the heat cycling between 600° C. and 1000° C. as the instant test condition are the same in heat cycling between room temperature and 1000° C.

With respect to Sample No. 12, it was held at 1000° C. in air for 10 hours, and cooled to room temperature. The measurement of the dimensionally shrunk rate between before and after the heating gave the shrinkage of 0.03%. On the other hand, it is seen from Table 1 that the dimensionally shrunk rate per one heat cycle was 0.024% with respect to 10 heat cycles after the firing. Therefore, the shrinkage of 0.03% is substantially equal to a dimensionally shrunk amount in one heat cycle. From this result, the above dimensional shrunk amount of 0.03% did not occur while the sample was held at 1000° C. for 10 hours, but it occurred during the temperature-descending period in which the temperature was lowered from 1000° C. to room temperature. In other words, the phenomenon that the porous sintered body is shrunk in the above heat cycling is caused by a mechanism quite different from a mechanism according to which the sintering of the porous body proceeds by holding it at a high temperature.

Experiment 2

As in Experiment 1, given amounts of starting materials were selectively measured and mixed in each example to give a compounding recipe shown in Tables 2 and 3. As the starting materials, $La_2O_3$, $Mn_3O_4$, $CaCO_3$, $Y_2O_3$, NiO, CuO, $Dy_2O_3$, MgO, $Sm_2O_3$, $Al_2O_3$, $Nd_2O_3$, CoO, $SrCO_3$, and $Cr_2O_3$ were used in the form of powder.

In each Example, a porous sintered body was produced in the same manner as in Experiment 1, and the porosity, the dimensionally shrunk rate and the average coefficient of thermal expansion of the porous sintered body were measured. Results are shown in Tables 2 and 3. In Table 2, samples as examples of the present invention are given, and in Table 3, those as reference examples are given.

TABLE 2

| Sample No. | Composition | Porosity (%) | Coefficient of dimensional shrinkage (%/10 cycles) | Average coefficient of thermal expansion ($\times 10^{-6} K^{-1}$) |
|---|---|---|---|---|
| 31 | $La_{0.45}Ca_{0.25}Y_{0.30}Mn_{0.90}Ni_{0.05}Cu_{0.05}O_3$ | 32.1 | 0.07 | 10.5 |
| 32 | $La_{0.45}Ca_{0.25}Dy_{0.30}Mn_{0.90}Mg_{0.10}O_3$ | 33.2 | 0.02 | 10.5 |

TABLE 2-continued

| Sample No. | Composition | Porosity (%) | Coefficient of dimensional shrinkage (%/10 cycles) | Average coefficient of thermal expansion ($\times 10^{-6} K^{-1}$) |
|---|---|---|---|---|
| 33 | $La_{0.15}Ca_{0.35}Sm_{0.50}Mn_{0.85}Al_{0.15}O_3$ | 30.9 | 0.02 | 10.7 |
| 34 | $La_{0.35}Ca_{0.15}Nd_{0.50}Mn_{0.85}Co_{0.15}O_3$ | 30.7 | 0.03 | 10.6 |
| 35 | $La_{0.10}Ca_{0.30}Nd_{0.60}Mn_{0.90}Ni_{0.10}O_3$ | 31.7 | 0.02 | 10.6 |
| 36 | $La_{0.20}Sr_{0.30}Y_{0.50}Mn_{0.95}Cr_{0.05}O_3$ | 30.5 | 0.03 | 10.7 |

TABLE 3

| Sample No. | Composition | Porosity (%) | Coefficient of dimensional shrinkage (%/10 cycles) | Average coefficient of thermal expansion ($\times 10^{-6} K^{-1}$) |
|---|---|---|---|---|
| 41 | $La_{0.75}Ca_{0.25}Mn_{0.90}Ni_{0.05}Cu_{0.05}O_3$ | 33.1 | 0.06 | 11.2 |
| 42 | $La_{0.75}Ca_{0.25}Mn_{0.90}Mg_{0.10}O_3$ | 31.1 | 0.02 | 11.1 |
| 43 | $La_{0.65}Ca_{0.35}Mn_{0.85}Al_{0.15}O_3$ | 30.7 | 0.01 | 11.6 |
| 44 | $La_{0.85}Ca_{0.15}Mn_{0.85}Co_{0.15}O_3$ | 32.2 | 0.02 | 11.3 |
| 45 | $La_{0.70}Ca_{0.30}Mn_{0.90}Ni_{0.10}O_3$ | 31.4 | 0.03 | 11.5 |

In Sample No. 41, the dimensionally shrunk rate of the porous sintered body is conspicuously reduced by replacing a part of the B-sites by nickel and copper. However, when Sample No. 31 is compared with Sample No. 41, it is seen that the average coefficient of thermal expansion can be conspicuously reduced by replacing a part of A-sites by yttrium in the composition in which a part of the B-sites are replaced by nickel and copper.

Similarly, when Sample No. 32 is compared with Sample No. 42, it is seen that the average coefficient of thermal expansion can be conspicuously reduced by replacing a part of A-sites by dysprosium in the composition in which a part of B-sites are replaced by magnesium.

When Sample No. 33 is compared with Sample No. 43, it is seen that the average coefficient of thermal expansion can be conspicuously reduced by replacing a part of A-sites by samarium in the composition in which a part of B-sites are replaced by aluminum. When Sample No. 34 is compared with Sample No. 44, it is seen that the average coefficient of thermal expansion can be conspicuously reduced by replacing a part of A-sites by neodymium in the composition in which a part of the B-sites are replaced by nickel and cobalt.

Further, when Sample No. 35 is compared with Sample No. 45, the average coefficient of thermal expansion can be conspicuously reduced by replacing a part of A-sites by neodymium in the composition in which a part of B-sites are replaced by nickel.

Further, when Sample Nos. 31–36 of the present invention are compared with Sample Nos. 11 through 22, the dimensionally shrunk rates of the invention porous sintered bodies are smaller, and the average coefficients of thermal expansion thereof can be successfully suppressed to low levels.

Experiment 3

As in Experiment 1, given amounts of starting materials were selectively measured and mixed in each example to give a compounding recipe shown in Table 4 or 5. As the starting materials, $La_2O_3$, $Mn_3O_4$, $CaCO_3$, $Y_2O_3$, NiO, ZnO, $Pr_6O_{11}$, $Al_2O_3$, $Dy_2O_3$, CoO, $Sm_2O_3$, MgO, $Nd_2O_3$, $SrCO_3$, and $Cr_2O_3$ were used.

In each Example, a porous sintered body was produced in the same manner as in Experiment 1, and the porosity, the dimensionally shrunk rate and the average coefficient of thermal expansion of the porous sintered body were measured. Results are shown in Tables 4 and 5. In Tables 4 and 5, samples as examples of the present invention are given. Table 4 shows examples in which B-sites are replaced by one or more kinds of the third metals within the scope of the present invention. Table 5 show examples in which the A-sites are replaced by the first and second metallic elements, but no B-sites are replaced.

TABLE 4

| Sample No. | Composition | Porosity (%) | Coefficient of dimensional shrinkage (%/10 cycles) | Average coefficient of thermal expansion ($\times 10^{-6}K^{-1}$) |
|---|---|---|---|---|
| 51 | $La_{0.45}Ca_{0.25}Y_{0.30}Mn_{0.90}Ni_{0.05}Zn_{0.05}O_3$ | 31.5 | 0.33 | 10.6 |
| 52 | $La_{0.45}Ca_{0.25}Pr_{0.30}Mn_{0.85}Al_{0.15}O_3$ | 33.2 | 0.37 | 10.5 |
| 53 | $La_{0.55}Ca_{0.15}Dy_{0.30}Mn_{0.95}Co_{0.05}O_3$ | 30.8 | 0.41 | 10.5 |
| 54 | $La_{0.35}Ca_{0.25}Sm_{0.40}Mn_{0.90}Mg_{0.10}O_3$ | 32.7 | 0.06 | 10.7 |
| 55 | $La_{0.30}Ca_{0.20}Nd_{0.50}Mn_{0.90}Ni_{0.10}O_3$ | 31.9 | 0.29 | 10.7 |
| 56 | $La_{0.10}Sr_{0.30}Nd_{0.60}Mn_{0.98}Cr_{0.02}O_3$ | 31.1 | 0.21 | 10.7 |
| 57 | $La_{0.35}Sr_{0.20}Y_{0.45}Mn_{0.85}Ni_{0.10}Cr_{0.05}O_3$ | 32.9 | 0.19 | 10.7 |
| 58 | $La_{0.35}Sr_{0.20}Y_{0.45}Mn_{0.90}Ni_{0.10}O_3$ | 34.5 | 0.28 | 10.6 |

TABLE 5

| Sample No. | Composition | Porosity (%) | Coefficient of dimensional shrinkage (%/10 cycles) | Average coefficient of thermal expansion ($\times 10^{-6}K^{-1}$) |
|---|---|---|---|---|
| 61 | $La_{0.45}Ca_{0.25}Y_{0.30}MnO_3$ | 31.9 | 0.67 | 10.5 |
| 62 | $La_{0.35}Sr_{0.20}Y_{0.45}MnO_3$ | 31.6 | 0.98 | 10.6 |

When Sample No. 61 is compared with Sample Nos. 11 through 16 shown before in Table 1, it is seen that with respect to the composition in which the amount of the element replacing the A-sites is the same, Sample No. 61 has a lower average coefficient of thermal expansion and more excellent physical properties.

When Sample No. 62 is compared with Sample Nos. 21 and 22, it is seen that Sample No. 62 has a lower average coefficient of thermal expansion and more excellent physical properties.

When Sample No. 51 is compared with Sample No. 61 in which the A-sites are replaced by calcium and yttrium, it is seen that the B-sites are replaced by nickel and zinc in Sample No. 51. In Sample No. 51, it is seen that the dimensionally shrunk rate is further reduced.

When Sample No. 57 and Sample No. 62 are compared with each other in which the A-sites are replaced by strontium and yttrium, it is seen that the B-sites are replaced by nickel and chromium in Sample No. 57. In Sample No. 57, the dimensionally shrunk rate is further reduced.

Experiment 4

In the same manner as mentioned above, porous sintered bodies having respective compositions shown in Table 6 were produced, and their various properties were measured as mentioned before. Results are shown in Table 6.

TABLE 6

| Sample No. | Composition | Porosity (%) | Coefficient of dimensional shrinkage (%/10 cycles) | Average coefficient of thermal expansion ($\times 10^{-6}K^{-1}$) | Electric conductivity (S/cm) |
|---|---|---|---|---|---|
| 71 | $La_{0.10}Ca_{0.30}Nd_{0.60}MnO_3$ | 30.3 | 0.02 | 10.0 | 100 |
| 72 | $La_{0.15}Ca_{0.30}Nd_{0.55}MnO_3$ | 31.2 | 0.02 | 10.8 | 102 |

It is seen from the above results that when the replacing amount of calcium is around 25 to around 35% and if around 30 to around 60% of the B-sites are replaced by a rare earth element, the dimensionally shrunk rate is not only reduced, but also the average coefficient of thermal expansion is reduced, and the electric conductivity is enhanced. Electric conductivity is shown by index taking the result of Sample No. 71 as 100.

Further, FIG. 1 shows measurement results of the average coefficient of thermal expansion with respect to porous sintered bodies having the composition of La—Ca—Nd series or Y—Mn series. It is seen from FIG. 1 that when the replacing amount of calcium is around 35%, 20 to 60% of the B-sites are replaced by the rare earth element or elements.

Figure 2:
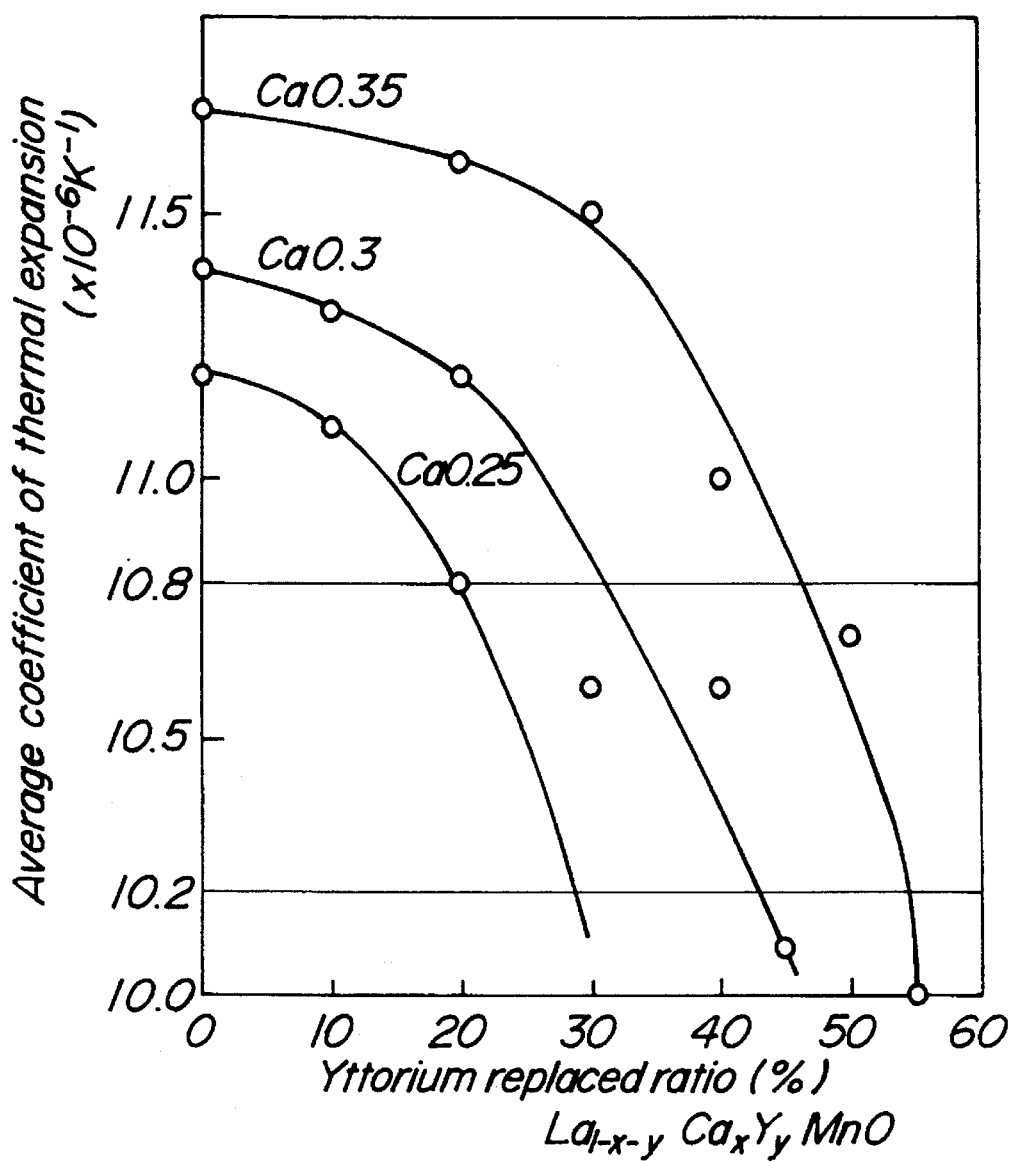
FIG. 2 is a graph showing average coefficients of thermal expansion measured with respect to porous sintered bodies having compositions of La—Ca—Y—Mn series.

Further, FIG. 2 shows measurement results of the average coefficient of thermal expansion with respect to porous sintered bodies having the composition of La—Ca—Y—Mn series. It is totally seen from the results of FIGS. 1 and 2 that when the replacing amount of calcium, etc. is 5–15%, the replacing amount of the rare earth element or elements is preferably 20 to 60%; when the replacing amount in the A-sites is 15–30%, the replacing amount of the rare earth element is preferably 10 to 50%; when the replacing amount of the A-sites is 30–40%, the replacing amount of the rare earth element is preferably 30 to 60%; and when the replacing amount in the A-sites is not less than 40%, the replacing amount of the rare earth element is preferably not less than 40%.

With respect to a case where Nd, Sm and Gd are used as the rare earth element, it is confirmed that results similar to those given above were obtained.

As mentioned above, when the porous sintered body according to the present invention is subjected to heating/cooling cycles between a temperature range of room temperature to 600° C. and a temperature range of 900° to 1000° C., the dimensional shrinkage of the porous sintered body can be largely suppressed. Therefore, when this porous sintered body is used as a material for a high temperature electrode, no cracking occurs between the porous sintered body and the other constituent materials. In addition, since the average coefficient of thermal expansion of the porous sintered body in a temperature range of 25° C. to 1000° C. can be suppressed to a relatively low range of $10.2 \times 10^{-6} K^{-1}$ to $10.8 \times 10^{-6} K^{-1}$, cracking and breakage are difficult to occur due to difference in coefficient of thermal expansion between the other materials.

What is claimed is:

1. A porous sintered body comprising a perovskite composite oxide, wherein A-sites of said composite oxide are occupied by (i) at least one first metallic element selected from the group consisting of calcium and strontium, (ii) at least one second metallic element selected from, the group consisting of scandium, yttrium, praseodymium, neodymium, promethium, samarium, europium, gadolinium, terbium, dysprosium, holmium, erbium, thulium, ytterbium, and lutetium, and (iii) lanthanum, wherein said at least one first metallic element amounts to 5 to 70 mol % of said A-sites, and manganese is contained in B-sites of said composite oxide.

2. The porous sintered body set forth in claim 1, wherein said at least one second metallic element is selected from the group consisting of praseodymium, neodymium, samarium, dysprosium, gadolinium and yttrium.

3. The porous sintered body set forth in claim 1, wherein at least one second metallic element amounts to 1 to 80 mol % of said A-sites.

4. The porous sintered body set forth in claim 2, wherein said at least one second metallic element amounts to 1 to 80 mol % of said A-sites.

5. The porous sintered body set forth in claim 1 wherein a part of said B-sites are occupied by at least one third metallic element selected from the group consisting of aluminum, cobalt, magnesium and nickel, and the remainder of the B-sites are occupied by manganese.

6. The porous sintered body set forth in claim 1, wherein a part of said B-sites are occupied by at least one third metallic element selected from the group consisting of chromium, copper, iron, titanium and zinc, and the remainder of the B-sites are occupied by manganese.

7. The porous sintered body set forth in claim 1, wherein a part of said B-sites are occupied by at least one third metallic element selected from the group consisting of aluminum, cobalt, magnesium, nickel, chromium, copper, iron, titanium and zinc, and the remainder of the B-sites are occupied by manganese.

8. The porous sintered body set forth in claim 1, wherein said B-sites are occupied by manganese.

9. The porous sintered body set forth in claim 1, wherein the average coefficient of thermal expansion of the sintered body in a range from 25° C. to 1000° C. is not less than $10.2 \times 10^{-6} K^{-1}$ and not more than $10.8 \times 10^{-6} K^{-1}$.

10. The porous sintered body set forth in claim 5, wherein the average coefficient of thermal expansion of the sintered body in a range from 25° C. to 1000° C. is not less than $10.2 \times 10^{-6} K^{-1}$ and not more than $10.8 \times 10^{-6} K^{-1}$.

11. The porous sintered body set forth in claim 6, wherein the average coefficient of thermal expansion of the sintered body in a range from 25° C. to 1000° C. is not less than $10.2 \times 10^{-6} K^{-1}$ and not more than $10.8 \times 10^{-6} K^{-1}$.

12. The porous sintered body set forth in claim 7, wherein the average coefficient of thermal expansion of the sintered body in a range from 25° C. to 1000° C. is not less than $10.2 \times 10^{6} K^{-1}$ and not more than $10.8 \times 10^{-6} K^{-1}$.

13. The porous sintered body set forth in claim 8, wherein the average coefficient of thermal expansion of the sintered body in a range from 25° C. to 1000° C. is not less than $10.2 \times 10^{-6} K^{-1}$ and not more than $10.8 \times 10^{-6} K^{-1}$.

14. The porous sintered body set forth in claim 1, wherein thermal shrinkage of the porous sintered body caused by heat cycling between room temperature and 1000° C. is not more than 0.01% per one heat cycle.

15. The porous sintered body set forth in claim 5, wherein thermal shrinkage of the porous sintered body caused by heat cycling between room temperature and 1000° C. is not more than 0.01% per one heat cycle.

16. The porous sintered body set forth in claim 6, wherein thermal shrinkage of the porous sintered body caused by heat cycling between room temperature and 1000° C. is not more than 0.01% per one heat cycle.

17. The porous sintered body set forth in claim 7, wherein thermal shrinkage of the porous sintered body caused by heat cycling between room temperature and 1000° .C is not more than 0.01% per one heat cycle.

18. The porous sintered body set forth in claim 8, wherein thermal shrinkage of the porous sintered body caused by heat cycling between room temperature and 1000° C. is not more than 0.01% per one heat cycle.

19. The porous sintered body set forth in claim 1, wherein porosity of the porous sintered body is not less than 5% and not more than 40%.

20. A solid oxide fuel cell, comprising an air electrode made of said porous sintered body set forth in claim 5.

21. A solid oxide fuel cell, comprising an air electrode made of said porous sintered body set forth in claim 6.

22. A solid oxide fuel cell, comprising an air electrode made of said porous sintered body set forth in claim 7.

23. A solid oxide fuel cell, comprising an air electrode made of said porous sintered body set forth in claim 8.

24. The solid oxide fuel cell set forth in claim 20, wherein said air electrode supports the fuel cell.

25. The solid oxide fuel cell set forth in claim 21, wherein said air electrode supports the fuel cell.

26. The solid oxide fuel cell set forth in claim 22, wherein said air electrode supports the fuel cell.

27. The solid oxide fuel cell set forth in claim 23, wherein said air electrode supports the fuel cell.

28. The solid oxide fuel cell set forth in claim 24, wherein said air electrode has a cylindrical shape.

29. The porous sintered body set forth in claim 2, wherein a part of said B-sites are occupied by at least one third metallic element selected from the group consisting of aluminum, cobalt, magnesiumand nickel, and the remainder of the B-sites are occupied by manganese.

30. The porous sintered body set forth in claim 3, wherein a part of said B-sites are occupied by at least one third metallic element selected from the group consisting of aluminum, cobalt, magnesiumand nickel, and the remainder of the B-sites are occupied by manganese.

31. The porous sintered body set forth in claim 4, wherein a part of said B-sites are occupied by at least one third metallic element selected from the group consisting of aluminum, cobalt, magnesium and nickel, and the remainder of the B-sites are occupied by manganese.

32. The porous sintered body set forth in claim 2, wherein a part of said B-sites are occupied by at least one third metallic element selected from the group consisting of chromium, copper, iron, titanium and zinc, and the remainder of the B-sites are occupied by manganese.

33. The porous sintered body set forth in claim 3, wherein a part of said B-sites are occupied by at least one third metallic element selected from the group consisting of chromium, copper, iron, titanium and zinc, and the remainder of the B-sites are occupied by manganese.

34. The porous sintered body set forth in claim 4, wherein a part of said B-sites are occupied by at least one third metallic element selected from the group consisting of chromium, copper, iron, titanium and zinc, and the remainder of the B-sites are occupied by manganese.

35. The porous sintered body set forth in claim 2, wherein a part of said B-sites are occupied by at least one third metallic element selected from the group consisting of aluminum, cobalt, magnesium, nickel, chromium, copper, iron, titanium and zinc, and the remainder of the B-sites are occupied by manganese.

36. The porous sintered body set forth in claim 3, wherein a part of said B-sites are occupied by at least one third metallic element selected from the group consisting of aluminum, cobalt, magnesium, nickel, chromium, copper, iron, titanium and zinc, and the remainder of the B-sites are occupied by manganese.

37. The porous sintered body set forth in claim 4, wherein a part of said B-sites are occupied by at least one third metallic element selected from the group consisting of aluminum, cobalt, magnesium, nickel, chromium, copper, iron, titanium and zinc, and the remainder of the B-sites are occupied by manganese.

38. The porous sintered body set forth in claim 2, wherein said B-sites are occupied by manganese.

39. The porous sintered body set forth in claim 3, wherein said B-sites are occupied by manganese.

40. The porous sintered body set forth in claim 4, wherein said B-sites are occupied by manganese.

41. The porous sintered body set forth in claim 2, wherein the average coefficient of thermal expansion of the sintered body in a range from 25° C. to 1000° C. is not less than $10.2 \times 10^{-6} K^{-1}$ and not more than $10.8 \times 10^{-6} K^{-1}$.

42. The porous sintered body set forth in claim 3, wherein the average coefficient of thermal expansion of the sintered body in a range from 25° C. to 1000° C. is not less than $10.2 \times 10^{-6} K^{-1}$ and not more than $10.8 \times 10^{-6} K^{-1}$.

43. The porous sintered body set forth in claim 4, wherein the average coefficient of thermal expansion of the sintered body in a range from 25° C. to 1000° C. is not less than $10.2 \times 10^{-6} K^{-1}$ and not more than $10.8 \times 10^{-1} K^{-1}$.

44. The porous sintered body set forth in claim 2, wherein thermal shrinkage of the porous sintered body caused by heat cycling between room temperature and 1000° C. is not more than 0.01% per one heat cycle.

45. The porous sintered body set forth in claim 3, wherein thermal shrinkage of the porous sintered body caused by heat cycling between room temperature and 1000° C. is not more than 0.01% per one heat cycle.

46. The porous sintered body set forth in claim 4, wherein thermal shrinkage of the porous sintered body caused by heat cycling between room temperature and 1000° C. is not more than 0.01% per one heat cycle.

47. The porous sintered body set forth in claim 2, wherein porosity of the porous sintered body is not less than 5% and not more than 40%.

48. The porous sintered body set forth in claim 3, wherein porosity of the porous sintered body is not less than 5% and not more than 40%.

49. The porous sintered body set forth in claim 4, wherein porosity of the porous sintered body is not less than 5% and not more than 40%.

50. A solid oxide fuel cell, comprising an air electrode made of said porous sintered body set forth in claim 1.

51. A solid oxide fuel cell, comprising an air electrode made of said porous sintered body set forth in claim 2.

52. A solid oxide fuel cell, comprising an air electrode made of said porous sintered body set forth in claim 3.

53. A solid oxide fuel cell, comprising an air electrode made of said porous sintered body set forth in claim 4.

* * * * *